(No Model.)

D. R. C. DEVINE.
WHEEL FOR BICYCLES.

No. 585,325. Patented June 29, 1897.

WITNESSES:
P. F. Nagle.
E. H. Fairbanks.

INVENTOR
David R. C. Devine
BY
Wiedersheim & Fairbanks
ATTORNEY.

UNITED STATES PATENT OFFICE.

DAVID R. C. DEVINE, OF PHILADELPHIA, PENNSYLVANIA, ASSIGNOR OF ONE-HALF TO ISAAC F. HOFFNER, OF SAME PLACE.

WHEEL FOR BICYCLES.

SPECIFICATION forming part of Letters Patent No. 585,325, dated June 29, 1897.

Application filed April 7, 1897. Serial No. 631,055. (No model.)

*To all whom it may concern:*

Be it known that I, DAVID R. C. DEVINE, a citizen of the United States, residing in the city and county of Philadelphia, State of Pennsylvania, have invented a new and useful Improvement in Wheels for Bicycles and other Vehicles, which improvement is fully set forth in the following specification and accompanying drawings.

My invention consists of an improved construction of wheel for bicycles and other vehicles which can be cheaply manufactured and is adapted to take the place of the pneumatic tires now employed, the novel features of the invention being hereinafter fully set forth, and pointed out in the claims.

Figure 1:
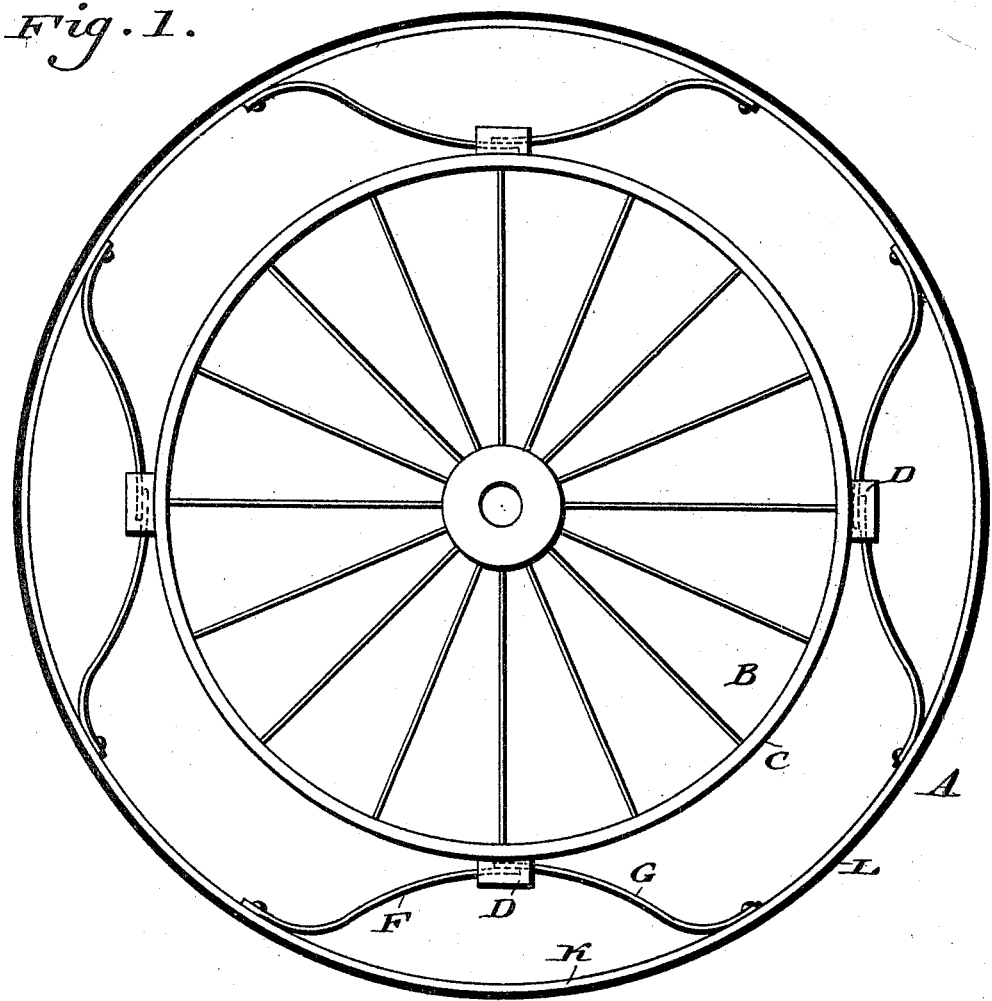
Figure 2:
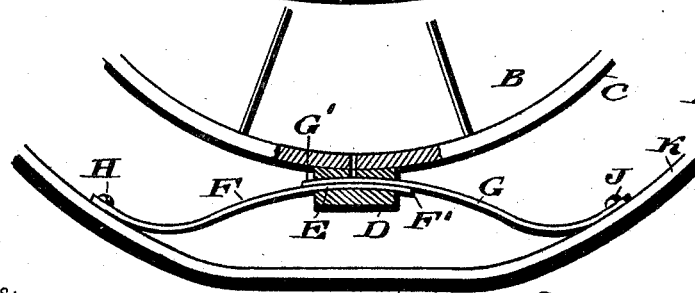

Figure 1 represents a side elevation of a wheel for bicycles and other vehicles embodying my invention. Fig. 2 represents, on an enlarged scale, a side elevation of a portion of said wheel, a part thereof being shown in section.

Similar letters of reference indicate corresponding parts in the figures.

Referring to the drawings, A designates a wheel, showing the parts in assembled position, the same consisting of an inner wheel B, which has attached to its felly C, at suitable intervals along its periphery, the blocks D, which latter have a slot or passage E therethrough.

F and G designate springs or resilient strips which are attached at the points H and J to the outer ring or felly K, which is provided with the resilient tire L, it being noted that the free ends F' G' of said resilient strips are seated in said passage E and are capable of sliding freely upon each other, thereby imparting the desired resiliency to the outer felly as well as to the vehicle or rider carried by the above wheels.

It will be seen from the foregoing that a wheel constructed as described possesses all the advantages of a pneumatic-tired wheel without the liability of puncture or disablement to which pneumatic tires are subject.

Having thus described my invention, what I claim as new, and desire to secure by Letters Patent, is—

1. A vehicle-wheel consisting of an inner felly having a block attached thereto, an outer ring or felly concentric with the former felly, and springs attached to said outer felly, and having their free ends seated in a passage in said block, said free ends being movable relatively to each other.

2. A vehicle-wheel consisting of an inner felly C, the latter having blocks D attached thereto at intervals along its outer periphery, each of said blocks having a passage E therethrough, an outer felly K having a resilient tire L attached thereto, springs F and G attached to the outer felly and having their free ends F', G', seated in said passage E, said free ends being movable relatively to each other.

DAVID R. C. DEVINE.

Witnesses:
JOHN A. WIEDERSHEIM,
WM. C. WIEDERSHEIM.